UNITED STATES PATENT OFFICE 2,471,274

NITROALKYL SULFITES AND PROCESS FOR PREPARING THEM

Shirley P. Lingo, Terre Haute, Ind., assignor to Commercial Solvents Corporation, Terre Haute, Ind., a corporation of Maryland No Drawing. Application July 29, 1946, Serial No. 686,947

5 Claims. (Cl. 260—327)

This invention relates to certain nitroalkyl sulfites and to a method for preparing them.

It has been known in the past that various chlorinated compounds can be prepared from certain alcohols by a method which comprises treating the alcohols with various "chlorinating agents," including thionyl chloride (SOCl₂), to replace the hydroxyl group or groups with chlorine.

I have now found that nitro hydroxy compounds of the general structure,

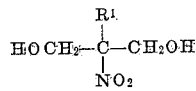

wherein $R^1$ represents a substituent selected from a class consisting of lower alkyl and hydroxymethyl, will react under suitable conditions with thionyl chloride to produce, not a chlorine compound, but instead, nitroalkyl sulfites. The structure of the product varies, as would be expected, according to the number of hydroxyl groups present in the nitro alcohol, and according to the number of the hydroxyl groups that react with the thionyl chloride. For example, nitroalkanediols give rise to cyclic sulfites,

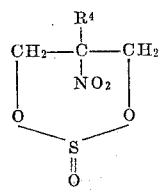

wherein $R^4$ is a lower alkyl group. From tris-(hydroxymethyl) nitromethane (the only trihydric alcohol falling within the scope of the generic structural formula given above), at least three products are possible:

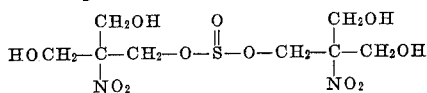

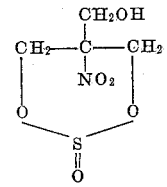

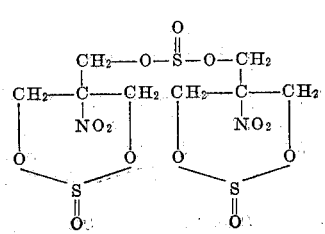

In preparing the new ester compounds of my invention, I mix a suitable nitro hydroxy compound, as defined above, with thionyl chloride, preferably in the presence of an indifferent solvent, i. e., one which does not react with either the reactants or reaction products; and after the desired reaction has taken place, I separate the product by suitable means, such as crystallization or distillation at low pressure.

The reaction may be carried out by preparing a solution of the nitro hydroxy compound in a suitable solvent and adding thionyl chloride slowly to the solution in a suitable reaction vessel, such as a glass flask, a glass-lined metallic vessel, or other reaction vessel that is suitably resistant to the action of the reactants and reaction product. The thionyl chloride is ordinarily added in a ratio between about one-half and one and one-half moles per mole of nitro hydroxy compound, depending on the desired extent of the esterification. The reaction is exothermic, and begins ordinarily around room temperature; so it is desirable to provide means for cooling the reaction mixture, such as by an external jacket or liquid bath, or an internal coil. It is desirable, also, to agitate the reaction mixture in order to assist the reaction and the rate of heat transfer. After the greater portion of the reaction has taken place, it is desirable to heat the reaction mixture to a temperature around 60 to 75° C., or somewhat higher, for a period up to around three hours, in order to drive the reaction to completion. The desired nitroalkyl esters may then be separated by conventional means. For example, a portion of the solvent may be removed by distillation, and the desired product may be crystallized from the resulting concentrate, or from a solution of the concentrate in another solvent, such as acetone.

Among the nitro hydroxy compounds suitable for use in my process are 2-nitro-2-methyl-1,3-propanediol, tris(hydroxymethyl)-nitromethane, 2-nitro-2-ethyl-1,3-propanediol, 2-nitro-2-hexyl-1,3-propanediol, 2-nitro-2-isobutyl-1,3-propanediol, and the like.

In preparing the products of my invention, it is necessary to use a solvent in the esterification of only those compounds which are solid at the low temperature desired. It is permissible to use a solvent in all cases, however, in order to assist in heat transfer, and in order to minimize any tendency of the thionyl chloride to produce overesterification at the point where it enters the reaction mixture. Any solvent, in general, which does not react with nitro hydroxy compounds, thionyl chloride, or nitroalkyl sulfites is suitable for use in my process. As examples of such solvents may be mentioned carbon tetrachloride, methylene chloride, chloroform, and the like.

The following specific examples will further illustrate my invention.

Example I

To an agitated suspension of 67.5 grams (0.5 mole) of 2-nitro-2-methyl-1,3-propanediol in 200 ml. of carbon tetrachloride were added dropwise 119.5 grams (1.0 mole) of thionyl chloride over a period of 2.5 hours. Hydrogen chloride evolution started shortly after the first introdution of thionyl chloride. The reaction mixture was stirred for an additional two hours, refluxed for three hours, and allowed to stand overnight. A solid precipitated and was separated. After partial evaporation of the filtrate, a second crop of product precipitated and was separated. The total yield of 2-nitro-2-methyl-1,3-propanediol sulfite was nearly the theoretical amount. After recrystallization from alcohol, the product melted at 110 to 112° C.

Example II

A round-bottom, three-neck reaction flask was equipped with a stirrer, a dropping funnel, a reflux condenser, and a thermometer. In it, a suspension of 101 grams (0.66 mole) of tris(hydroxymethyl)nitromethane in 210 ml. of dry carbon tetrachloride was heated to reflux (liquid temperature 65 to 75° C.), and 119 grams (1.0 mole) of thionyl chloride were added fairly rapidly. Much gas was evolved, and the mixture darkened in color. Refluxing was continued for one hour after all of the thionyl chloride had been introduced. Then 200 ml. of water were added at a temperature below 30° C., with the result that a gummy, semisolid mass separated. The water and carbon tetrachloride were decanted, and the residual gum was boiled with methanol. It crystallized readily, giving 71.5 grams of crude product. The conversion to the tris(hydroxymethyl)nitromethane sulfite wherein all of the hydroxyl groups have been esterified was 48.5% of theoretical, based on the nitro triol. On recrystallization from methanol, the product analyzed as follows: Calculated for $C_8H_{12}O_{13}N_2S_3$, 21.8% S; found, 21.5% S.

Example III

A suspension of 151 grams (1.0 mole) of tris(hydroxymethyl)nitromethane in 400 ml. of carbon tetrachloride was heated to reflux, and to it were added 199 grams (1.0 mole) of thionyl chloride. The mixture was refluxed an additional thirty minutes, and was then treated with 200 ml. of water. Three layers resulted: a lower layer of carbon tetrachloride, an upper aqueous layer, and a dark, tarry middle layer which proved to contain the product. The latter was heated to 80° C. under high vacuum in an effort to distill it, but without result; and on cooling, it soldified. The solid was dissolved in acetone and treated with an active carbon in an effort to decolorize it; but part of the color remained. When the acetone was evaporated, the residual syrupy liquid crystallized on cooling. Analysis: calculated for the tris(hydroxymethyl)nitromethane sulfite wherein only one hydroxyl group has been esterified ($C_4H_7O_6NS$): 16.24% S, molecular weight 197; found, 15.50% S, molecular weight 203.

The products of my invention are useful in numerous organic syntheses, and in particular as intermediates for the production of amines. They are also interesting and useful because of the presence, in a single molecule, of both reducing and oxidizing groups.

While the foregoing describes the preferred embodiments of my invention, it will be understood that departures may be made therefrom within the scope of the description and claims. In general, it may be said that any modifications or equivalents that would ordinarily occur to those skilled in the art are to be considered as lying within the scope of my invention.

In accordance with the foregoing specification, I claim as my invention:

1. A process for preparing 2-nitro-2-methyl-1,3-propanediol sulfite which comprises preparing a mixture of 2-nitro-2-methyl-1,3-propanediol with chloroform, slowly adding thionyl chloride thereto in approximately equimolecular ratio, refluxing the resulting mixture at atmospheric pressure until the reaction is substantially complete, and separating the resulting 2-nitro-2-methyl-1,3-propanediol sulfite by crystallization.

2. A process for preparing sulfites of tris(hydroxymethyl)nitromethane which comprises preparing a mixture of tris(hydroxymethyl)nitromethane with chloroform, slowly adding thionyl chloride thereto in a ratio between about 0.5 and 1.5 moles per mole of tris(hydroxymethyl)nitromethane, refluxing the resulting mixture at atmospheric pressure until the reaction is substantially complete, and separating the resulting sulfites of tris(hydroxymethyl)nitromethane by crystallization.

3. As new compositions of matter, sulphite esters selected from the group consisting of:

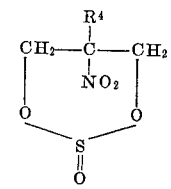

and

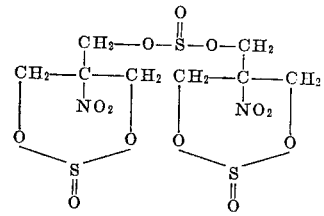

wherein $R^4$ is a lower alkyl group.

4. 2-nitro-2-methyl-1,3-propanediol sulfite having the structural formula:

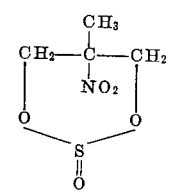

5. In the production of sulfite esters of nitrohydroxy compounds, the process which comprises preparing a mixture with an inert solvent of a nitro-hydroxy compound having the formula:

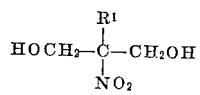

wherein $R^1$ represents a substituent selected from a class consisting of lower alkyl and hydroxymethyl, and with from about ½ to 1½ moles of thionyl chloride per mole of nitro hydroxy compound, heating the mixture to complete the reaction and recovering the resulting sulfite ester.

SHIRLEY P. LINGO.

(References on following page)

REFERENCES CITED

The following references are of record in the file of this patent:

UNITED STATES PATENTS

| Number | Name | Date |
|---|---|---|
| 2,377,148 | Hechenbleikner | May 29, 1945 |

FOREIGN PATENTS

| Number | Country | Date |
|---|---|---|
| 487,253 | Germany | Dec. 12, 1929 |

OTHER REFERENCES

Kyrides, J. Am. Chem. Soc., 66, 1006–7 (1944).